United States Patent [19]

Fitzgerald

[11] Patent Number: 5,197,328
[45] Date of Patent: * Mar. 30, 1993

[54] DIAGNOSTIC APPARATUS AND METHOD FOR FLUID CONTROL VALVES

[75] Inventor: William V. Fitzgerald, McKinney, Tex.

[73] Assignee: Fisher Controls International, Inc., Clayton, Mo.

[*] Notice: The portion of the term of this patent subsequent to Dec. 11, 2007 has been disclaimed.

[21] Appl. No.: 818,289

[22] Filed: Jan. 9, 1992

Related U.S. Application Data

[60] Division of Ser. No. 605,130, Oct. 24, 1990, Pat. No. 5,109,692, which is a division of Ser. No. 512,095, Apr. 10, 1990, Pat. No. 4,976,144, which is a continuation of Ser. No. 236,602, Aug. 25, 1988, abandoned.

[51] Int. Cl.$^5$ .............. G01M 19/00; F16K 37/00; G01L 5/00
[52] U.S. Cl. ................ 73/168; 73/862.321; 137/487.5; 364/558
[58] Field of Search .......... 73/168, 37, 4 R, 862.32; 137/487.5; 364/550, 558, 556

[56] References Cited

U.S. PATENT DOCUMENTS

| | | | |
|---|---|---|---|
| 2,569,299 | 9/1951 | Fegel | 73/4 R |
| 3,098,382 | 7/1963 | Hoffman et al. | 73/168 X |
| 4,029,122 | 6/1977 | Jaegtnes | 73/168 X |
| 4,274,438 | 6/1981 | LaCoste | 73/9 |
| 4,294,109 | 10/1981 | Peters et al. | 73/168 X |
| 4,464,931 | 8/1984 | Hendrick | 73/168 |
| 4,523,286 | 6/1985 | Koga et al. | 73/9 |
| 4,542,649 | 9/1985 | Charbonneau et al. | 73/168 |
| 4,598,579 | 7/1986 | Cummings et al. | 73/168 X |
| 4,660,416 | 4/1987 | Charbonneau et al. | 73/168 |
| 4,682,491 | 7/1987 | Pickard | 73/168 X |
| 4,690,003 | 9/1987 | McNennamy et al. | 73/168 X |
| 4,693,113 | 9/1987 | McNennamy et al. | 73/168 |
| 4,735,101 | 4/1988 | Charbonneau et al. | 73/862.32 |
| 4,761,999 | 8/1988 | Thompson | 73/168 |
| 4,856,327 | 8/1989 | Branam et al. | 73/168 |
| 4,888,996 | 12/1989 | Rak et al. | 73/168 |
| 4,891,975 | 1/1990 | Charbonneau et al. | 73/168 |
| 4,976,144 | 12/1990 | Fitzgerald | 73/168 |

FOREIGN PATENT DOCUMENTS 0264148 4/1988 European Pat. Off. .......... 73/168

OTHER PUBLICATIONS

"Control Valve Sizing", Les Driskell, *Instrument Society of America* (ISA), pp. 115-135 (1982).

Primary Examiner—William A. Cuchlinski, Jr.
Assistant Examiner—Diego F. F. Gutierrez
Attorney, Agent, or Firm—Marshall, O'Toole, Gerstein, Murray & Bicknell

[57] ABSTRACT

Apparatus and method for diagnostically testing and determining the operating condition of a pneumatically operated valve. A diagnostic controller is connected to a valve actuator assembly so that diaphragm pressure and valve plug movement among other inputs can be sensed while the valve actuator assembly is stroked through a test operation cycle. The sensor output signals are then used in selected graphical plots to provide information which can be analyzed to indicate the condition of the valve in such areas as spring adjustment, stroking time, valve travel, stem friction, seat load, and positioner and transducer calibration.

6 Claims, 4 Drawing Sheets

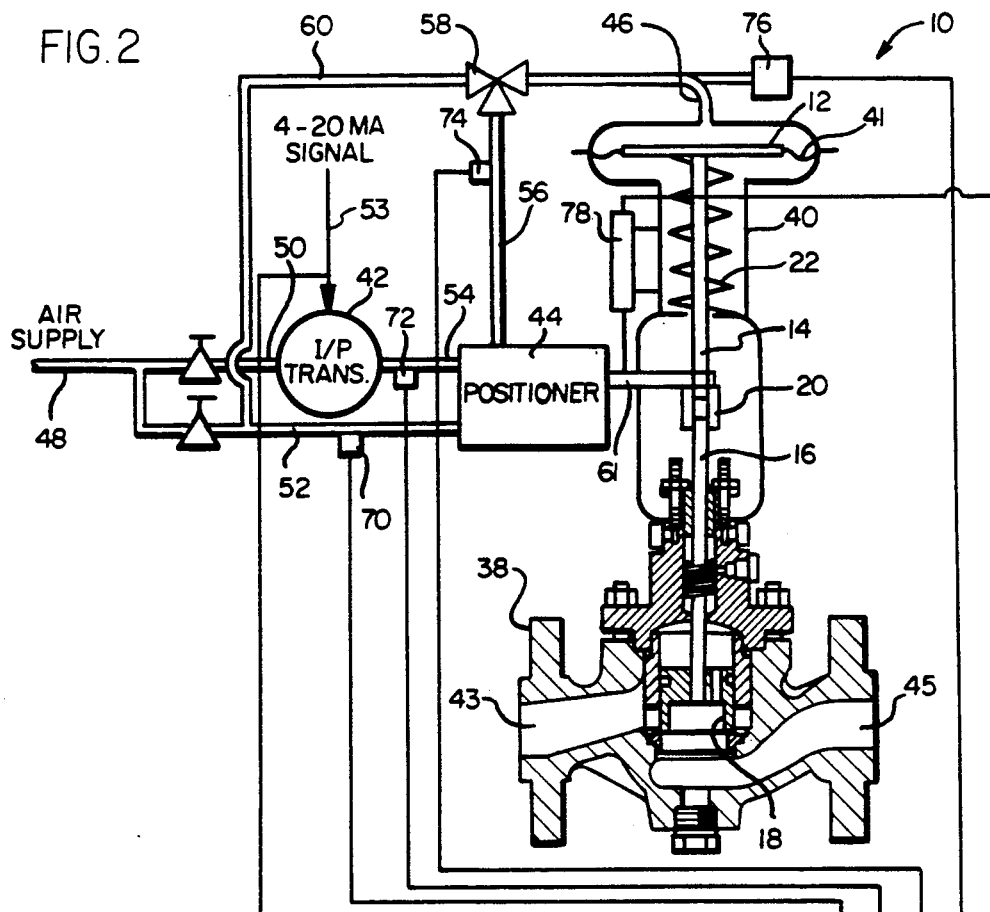
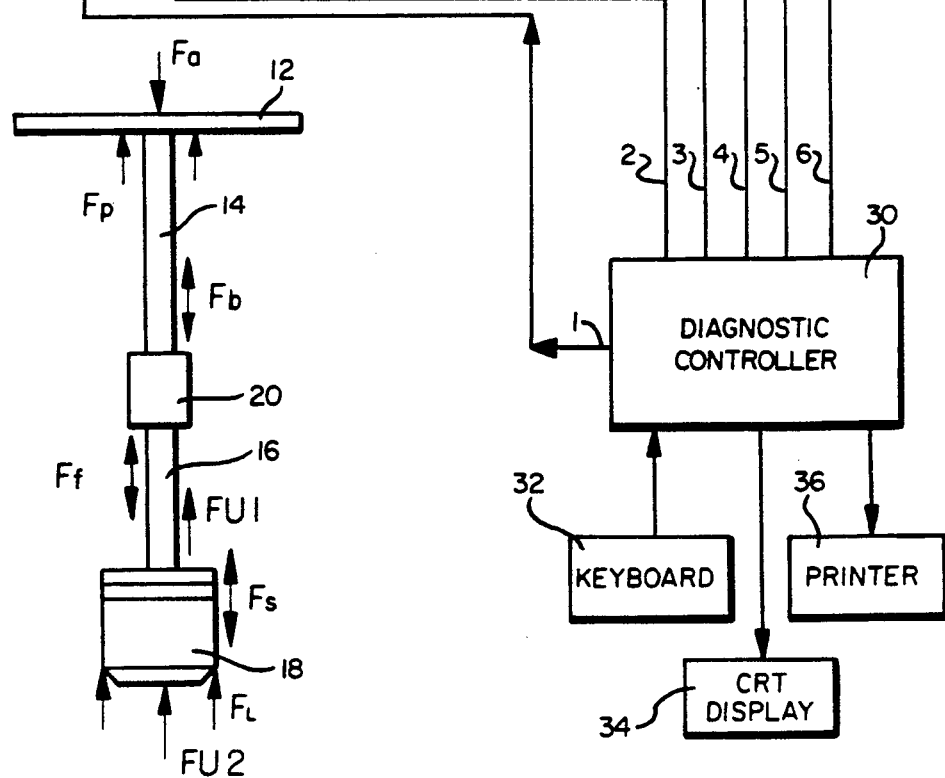

DIAGNOSTIC APPARATUS AND METHOD FOR FLUID CONTROL VALVES

This is a division of application Ser. No. 07/605,130, filed Oct. 24, 1990, now U.S. Pat. No. 5,109,692 which is a division of Ser. No. 07/512,095, filed Apr. 10, 1990, now U.S. Pat. No. 4,976,144, which is a continuation of Ser. No. 07/236,602, filed Aug. 25, 1988, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This invention relates to fluid control valves and more particularly to apparatus and a method for diagnostically testing and evaluating the condition of such valves, particularly pneumatically operated valves.

BACKGOUND OF THE INVENTION

Reference may be made to the following U.S. patents of interest: U.S. Pat. Nos. 4,542,649; 4,660,416; 4,690,003; 4,693,113; 4,712,071; 4,735,101.

Fluid control valves are used in a wide variety of applications such as oil and gas pipelines and processing lines, as well as to control water and other fluids in nuclear power generating stations. In such critical applications, substantial maintenance is required, both of the periodic preventative maintenance type as well as to repair valve breakdowns in order to assure that the control valve performs properly, thereby reducing losses associated with process fluid leakage and trim damage. It has been desired therefor to provide an easy and readily available technique for diagnostically checking such fluid control valves already installed in the system so that operational problems can be detected before they become the source of fluid process losses or, in the worse case, cause unscheduled shutdowns of the processing system.

A motor operated valve analysis and testing system is described in the above-mentioned patents for fluid control valves operated by a very specific type of electric actuator including a motor moving the valve stem through a worm gear, and a cluster of compression springs termed a "spring pack" for reacting to valve stem thrust. Spring pack movement is detected to provide an indirect indication of stem load. However this first requires that a calibration be done where the stem load is measured using a load cell and the readings correlated to spring pack movement. The load cell is then removed and the spring pack reading used to measure stem load during operation. Motor current is also measured and is correlated to stem load to give an indication of the overall condition of the motor. This prior art system is time consuming and cumbersome in requiring the initial calibrations as well as requiring a significant amount of time to install and remove the load cell on each actuator to be tested.

Furthermore, many fluid control valves, such as pneumatically actuated control valves do not have a motor or spring pack so that the valve measurements described earlier in connection with electrically actuated valves does not apply to such pneumatic units. Accordingly, it is desired to provide an improved technique for diagnostically testing fluid control valves, such as pneumatically operated valves in a fast and efficient manner.

SUMMARY OF THE INVENTION

In accordance with the principles of the present invention, there is provided apparatus and a method for diagnostically testing fluid control valves, such as pneumatically actuated valves. The technique includes providing a pressure sensor to sense varying pressure at the input of the valve actuator and a position sensor to sense movement of the valve plug. The valve is then dynamically operated through a dynamic test operation cycle by supplying a controlled variable pneumatic pressure to the input of the pneumatic valve actuator forming a dynamic input to the valve. During the test operation cycle the valve plug is moved through a desired range, normally from a fully opened position to a fully closed position and returned from the fully closed position to the fully opened position.

During the test operation cycle, the pressure sensor provides an output signal which corresponds to varying pressure at the valve actuator input indicating the dynamic input to the valve, and the position sensor provides an output signal corresponding to movement of the valve plug confirming to the dynamic output of the valve. The respective output signals of air pressure at the actuator and of valve plug or valve stem position are then processed to derive data representing the variation in pressure at the valve actuator input as a function of movement of the valve plug during the test operation cycle thereby providing a dynamic diagnostic testing of the valve. The valve stem load is derived by multiplying the air pressure times the effective area of the actuator diaphragm. Since the effective area is a known quantity, no calibration cycle is required to determine valve stem load as in the prior art.

Therefore a significant advantage of the present invention is the ability to immediately plot valve stem load versus valve position and display the plot such as on a visual display and/or a printer so that one can ascertain certain valve problems, such as valve sticking or intermittent hesitations caused by excessive friction, etc. Analysis of the plot of stem load versus valve plug travel provides several important pieces of information on the valve condition, namely:

1. A determination of valve packing, seal, and bearing friction. Excessive friction levels can affect actuator operation. Friction values that are too low may indicate insufficient load on the packing since packing friction is normally the largest of its three constituents;

2. Determine the valve spring constant and spring adjustment to thereby check for an incorrect or damaged spring and to determine whether the spring "benchset" has been properly adjusted;

3. Determine the valve seat load by determining the pressure at which the plug contacts the seat and comparing it to the final pressure; and 4. Determining that the valve plug is contacting the seat on the closing stroke.

A diagnostic check of the valve actuator can also be made with the present invention. In a conventional pneumatic operated valve, a current to pressure (I/P) transducer is coupled to a valve positioner which supplies an operating pneumatic pressure to the valve diaphragm actuator which in turn is coupled to a sliding valve stem and plug. A feedback is provided by a valve positioner arm having one end connected to the actuator/valve stem and the other end coupled to the positioner so as to track movement of the valve stem. Normally a 4-20 mA signal controls the valve operation.

The present invention includes providing a control signal to the I/P transducer to operate the valve over a test operation cycle, while taking measurements of the respective inputs and outputs of the I/P transducer and the valve positioner. Therefore, during the test operation cycle wherein the valve is stroked through its test cycle, the present apparatus provides a calibration check on the valve positioner and the I/P transducer. In addition, utilizing the above input information, the present system can verify valve stroke, actual stroking time, and pneumatic supply pressure.

BRIEF DESCRIPTION OF THE DRAWINGS

The features of this invention are set forth with particularity in the appended claims. The invention may be best understood by reference to the following description taken in conjunction with the accompanying drawings, in which like reference numerals identify like elements in the several figures and in which:

FIG. 1 is a schematic diagram of a fluid control valve and actuator assembly for a sliding stem valve to illustrate the moving parts that cause flow changes through the valve;

FIG. 2 is a schematic diagram illustrating a fluid control valve and actuator assembly and diagnostic valve testing apparatus in accordance with the present invention;

DETAILED DESCRIPTION

Figure 3:
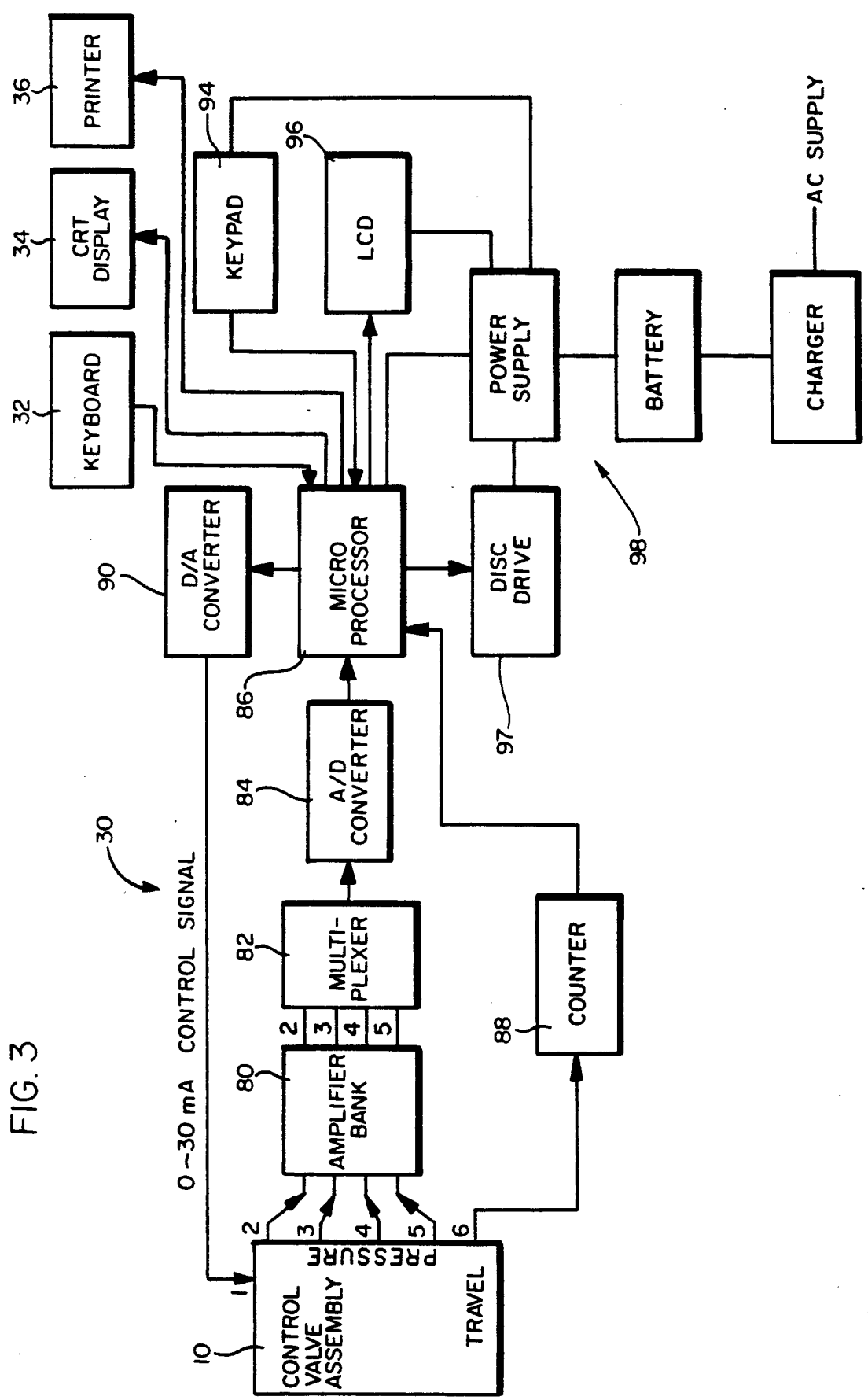
FIG. 3 is a block diagram illustrating the diagnostic valve controller components and the flow of input and output information in accordance with the present invention.

A very large variety of control valve and actuator combinations are commercially available. Such commercially available valve types include sliding stem, rotary ball, rotary plug, butterfly, and eccentric disk. The actuator can be spring and diaphragm, spring and piston, double acting piston, hydraulic, electrohydraulic, or electric, mounted on either a rotary or sliding stem valve. The present invention is particularly useful for fluid control valves using a pneumatically operated actuator with either diaphragms or pistons as their primary source of power. For purposes of illustrating the principles of the present invention, a spring and diaphragm actuator on a sliding stem valve is described hereinafter. It is to be understood however that the principles of this invention can also be adapted for use on a rotary valve.

FIG. 2 illustrates a fluid control valve and actuator assembly 10 schematically illustrated so that the force interactions can be better understood. The valve and actuator assembly 10 shown in FIG. 2 is known as a spring to open, flow-down, balanced construction and is one of the more common versions commercially available and used, however it is understood that the present invention can be applied equally well with other pneumatically operated versions.

Valve 10 includes diaphragm plate 12, actuator stem 14 and a valve plug/stem assembly including valve stem 16 and plug 18. A stem connector 20 connects actuator stem 14 to valve stem 16. Spring 22 normally exerts sufficient pressure upwardly on diaphragm 12 to lift the valve plug and stem assembly so that the valve is in the open position.

Referring now to FIG. 1, there is illustrated a simplified free body diagram of the valve and actuator with schematic representations of diaphragm 12, actuator stem 14, valve stem 16, plug 18 and connector 20. The illustrated components are the moving parts that cause changes in fluid flow through the valve. The respective forces labeled "F" and illustrated in FIG. 1 adjacent to a respective directional arrow are defined in the following Table 1.

TABLE 1

| Force Symbol | DEFINITION OF FORCES Description |
|---|---|
| Fa | The Product of the air pressure in the actuator and the effective area of the diaphragm. The effective area changes with valve plug travel, and this change is taken into account in the system's calculations. |
| Fp | The spring load acting against Fa, and expressed as $Fp = Fi + T(K)$. |
| Fi | Initial spring pre-load with the valve wide open. This is a function of the valve benchset, or in other words, the initial spring adjustment. |
| T | Valve plug travel with zero as the wide-open position. |
| K | Spring constant. |
| Fb | The actuator bearing friction force, which always acts in the direction opposite to stem movement. |
| Ff | Packing friction, especially important with graphite or asbestos-type packing where improper packing adjustment can result in relatively large variations in packing friction. |
| FU1 | The stem unbalance caused by the internal pressure acting on the unbalance area of the stem. |
| Fs | The friction force between the seal and the I.D. of the cage. This changes as a function of the type and diameter of the seal. |
| FL | The seat load between the plug and seat ring. This is critical in determining the shut-off capabilities of the valve in question. |
| FU2 | The pressure unbalance on the plug. It can be in either direction depending on whether the valve is flow-up or flow-down. In any case, in a balanced design it is very small. |

A general force balance on the parts, as shown in FIG. 1, results in the following equation:

$$Fa = Fp \pm (Fb) \pm (Ff) + FU1 \pm (Fs) + FL + FU2 \quad (1)$$

Applying the equation for the case where the valve is closing and ignoring the relatively small plug imbalance, yields the following:

$$Fa = Fp + Fb + Ff + FU1 + Fs + FL \quad (2)$$

Note that Fb, Ff and Fs are all friction forces and that Ff (Packing Friction) can vary considerably. If spring force is subtracted from Fa, it yields the net force available in the actuator stem to overcome the three friction forces and the pressure unbalance on the stem, and provide for sufficient seat load to limit through-leakage to acceptable levels. Simplifying Equation 2 yields:

$$(Fa - Fp) = Fn \text{ (net force)} = Ffr + FU1 + FL, \quad (3)$$

where $Ffr = Fb + Ff + Fs$

Examination of Equation 3 yields some interesting information. To successfully perform its duties, an actuator must be able to fully stroke the valve (usually with some velocity requirement) and load the seat to provide for proper shut-off. To fully stroke the valve, the net force available throughout the valve stroke must be slightly greater than (Ffr +FU1) or the stem won't move. The difference between Fn and (Ffr+FU1) together with the flow rate of the air supply, determines the velocity of stem movement. In addition, the actuator must apply FL to provide a seat load sufficient to assure shut-off in the closed position. This means that even though the net force available agrees with the original actuator sizing calculations, if one of the frictional forces of FU1 is too great, it would reduce the seat load and could even affect the ability of the valve to achieve full stroke. In equation form that is expressed as follows:

$$Fn > (Ffr + FU1) + FL \quad (4)$$

With Fn constant, any increase in (Ffr+FU1) must result in a decrease in FL (seat load). Reduced seat load causes unnecessary leakage with a resultant drop in process efficiency and possible trim damage.

In the same way, if Fn is too low even though (Ffr+FU1) is correct, the same problem results. Fn can be reduced if there is an insufficient air supply, or a spring that is adjusted too tightly or that has the wrong spring rate.

To avoid these problems and assure that the actuator/valve assembly will properly perform, requires a verification of the forces shown in Equation 3. The apparatus and method of the present invention described hereinafter with respect to FIGS. 2-8 provides a valve diagnostic check-up in a very fast and reliable dynamic test operation cycle under a controlled variable test input, i.e., a dynamic input. Several other useful diagnostic results are also obtained.

Referring now to FIG. 2, there is illustrated a diagnostic controller 30 which provides a 0-30 mA signal output on channel 1 in either a programmed ramp or step change form to stroke or, dynamically operate valve assembly 10 over a predetermined range and thereby provide respective sensor output signals on channels 2, 3, 4, 5, 6 to diagnostic controller 30. Information to be entered into controller 30 can be provided by keyboard 32 and the output information from controller 30 can be coupled to a CRT display 34 as well as to a printer 36.

Valve assembly 10 includes valve body 38 having valve plug 18 connected to valve stem 16 and in turn connected through stem connector 20 to actuator stem 14. Actuator stem 14 is in turn connected to diaphragm plate 12 which is mounted within a spring barrel 40 by means of flexible diaphragm 42 to control the flow of fluid between the inlet and outlet ports 43,45 of valve body 38. Spring 22 normally biases plate 12 upwardly so that in the sliding stem valve illustrated in FIG. 2, valve plug 18 is pulled up away from the valve seat so as to open the valve.

Actuation of the valve is provided by standard components including a current to pressure transducer 42 and a positioner 44 for supplying a controlled variable operating pressure, i.e. a dynamic input, at valve actuator input line 46. Such a typical configuration includes a supply of pressurized air on pneumatic line 48 which is split and fed through respective pneumatic lines through respective valves to the current to pressure (I/P) transducer as well as to valve positioner 44. Thus, input pneumatic line 50 to transducer 42 and input pneumatic line 52 to the valve positioner are each at the pneumatic supply pressure.

Normally, the signal input for controlling valve assembly 10 consists of a 4-20 mA signal on transducer input line 53 which will provide a corresponding output pressure of about 3-15 psi (0.21-1.06 kscm) on line 54 which is supplied to the controlled input of positioner 44. The output pressure of positioner 44 is supplied on line 56 to actuator pressure input line 46 in order to operate valve 10. A booster relay 58 may be provided when desired to increase the air volume. Booster relay 58 includes an input of supply line pressure on input line 60 to aid in proper operation of the valve actuator by positioner 44 under certain conditions. Valve positioner 44 also includes valve positioner arm 61 connected at one end to the actuator stem and at the other end within positioner 44 to provide valve position registration and thereby to insure that positioner 44 moves plug 18 the desired amount in response to changes in the input current to (I/P) transducer 42.

Accordingly, under ordinary operations of valve assembly 10, with about a 4 mA signal input to transducer 42, the transducer provides about a 3 psi (0.21 kscm) input to positioner 44, which in turn provides a corresponding pressure on actuator input line 46 which is not sufficient to overcome the upward bias force of spring 22 and the valve is therefore in the fully opened position. When the control current signal is raised to about 20 mA, transducer 42 provides about 15 psi (1.06 kscm) to positioner 44, which in turn provides a corresponding pressure input at line 46 via line 46 to counteract spring 22 and thereby slide valve stem 16 downwardly so as to seat valve plug 18 and thereby close the valve. Obviously, various valve positions in between the fully opened and fully closed position are obtained by variations in the input 4-20 mA current signal to transducer 42.

In order to provide diagnostic evaluation of valve 10 in terms of the valve characteristics previously described, a suitable output signal from diagnostic controller 30 is provided on current signal output channel 1 to transducer 42. As an example, a 0 to 30 mA signal on channel 1, providing a dynamic input to the valve is sufficient to insure that the valve is stroked through its fully opened and fully closed positions. Less than the full range of valve operation may also be provided. Pressure sensors 70, 72, 74 and 76 are temporarily mounted to sense the pneumatic pressure on the illustrated respective pneumatic lines and provide an electric output signal on respective input channels 2, 3, 4 and 5 to the diagnostic controller. Such pressure sensors are well known, commercially available items. If booster relay 58 is not present then sensor 74 is not needed.

A position sensor 78 is suitably temporarily removably mounted in the valve assembly to detect the linear positional movement of valve positioner arm 60 which corresponds to movement of valve plug 18. Position sensor 78 provides a corresponding electric output signal which is supplied to channel 6 of controller 30. Position sensor 78 is a commercially available device such as a digital linear gauge, manufactured by Nititoyo Company of Japan utilizing a light source and an etched glass light sensor to provide a signal on channel 6 in response to linear movement of the valve plug.

Thus, as valve assembly 10 is stroked through its test operating cycle by means of its control current signal on channel 1, a respective pressure is being sensed and the corresponding electric signals are fed to channels 2, 3, 4 and 5, and simultaneously the valve plug position and travel distance are being sensed and the corresponding electric signal is supplied on channel 6. The usefulness of obtaining such pressure and valve plug position information can be seen with reference to the following Table 2.

TABLE 2

| Channel Number | INPUT DESCRIPTIONS Descriptions |
|---|---|
| 2 | Supply Pressure to the Positioner. By monitoring this pressure, the user can verify that supply pressure is sufficient to provide full valve stroke and seat load. He can also check for pressure decay during the stroke, which can slow actuator operation that is sometimes caused by restrictions in the supply pressure line. |
| 3 | Signal to the Positioner. This can be used to check proper I/P transducer calibration when compared with channel 1 during valve stroke, since channel 2 is the input and channel 3 is the output. At the same time, a second display can be generated showing the relationship between channel 3 and channel 5, permitting the user to verify positioner calibration. |
| 4 | Signal to Booster relay-when present, checks booster input against booster output (channel 5) for proper operation. |
| 5 | Air-to-Diaphragm Signal. This is one of the key parameters that, when compared to channel 6 (valve position or travel), provides the force equation verification described with reference to equation (3). |
| 6 | Valve Position or Travel. The second half of the force equation verification related to positional movement of the valve plug. |

FIG. 3 illustrates the components of diagnostic controller 30 which supply the 0–30 mA control signal on channel 1 to control valve assembly 10 and receive the pressure related signals on channels 2, 3, 4, 5 and the valve travel distance information on channel 6. The pressure related signals are coupled through a bank of amplifiers 80, multiplexer 82, analog/digital converter 84 to microprocessor 86. The valve travel information on channel 6 is coupled to a counter 88 and then into microprocessor 86. A digital/ analog converter 90 converts the digital output of microprocessor 86 into the required analog control signal for channel 1. Providing suitable microprocessor program instructions for controlling the acquisition of data and developing graphic output plots is well within the skills of an ordinary programmer in the art. A program for microprocessor 86 is presented in Appendix A.

Keypad 92 and liquid crystal display 96 are provided for inputting and outputting information to the microprocessor. Suitable disc drive 97 and power supply components 98 are provided.

Figure 4:
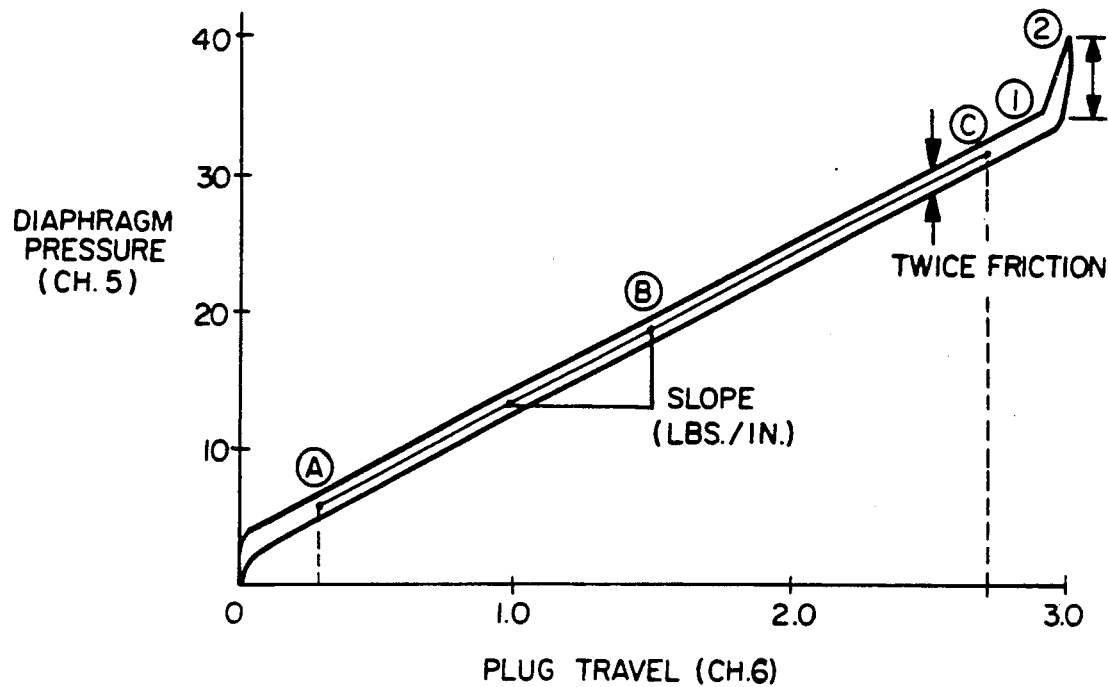
FIGS. 4-8 are graphic plots derived from the diagnostic controller output information and which plots are helpful in evaluating the valve and actuator condition.

Thus, as the valve assembly is stroked through its operating cycle, the corresponding pressure and valve travel information on channels 2 through 6 are obtained by microprocessor 86 and can be displayed immediately, or stored for later processing and display in graphical form for suitable analysis of the valve parameters. For example, the graphical plot of FIG. 4 can be provided from information derived from channel 5 and channel 6. FIG. 4 illustrates the change in diaphragm pressure, i.e. the pressure at input line 46 as sensed by pressure sensor 76 as a function of the valve travel sensed by position sensor 78 and which information is supplied on channel 6 as the valve is stroked from a fully open position near point A at the left-hand side of FIG. 4 to a fully closed position at the right-hand side of FIG. 4 near point C and then returned to a fully open position illustrated at the left-hand side of FIG. 4 near A. FIG. 4 allows the following valve parameters to be examined:

(1) Packing Seal and Bearing Friction—Since friction acts in both valve operating directions, the friction valve can be determined by measuring the vertical width of the band (between the reference arrows labelled "Twice Friction"), dividing by two, and multiplying by the effective area of the diaphragm. The system will automatically calculate this quantity and compare it to normal levels stored in the diagnostic controller for the valve in question. Excessive friction levels can affect actuator operation as described earlier. Friction values that are too low may indicate insufficient load on the packing since packing friction is normally the largest of the three friction constituents.

(2) Benchset (Spring Adjustment and Spring Constant)—The spring constant can be determined by computing the average slope of the curves from points A to C representing 10% to 90% of travel, and converting to force/distance units by using the effective diaphragm area. Spring adjustment is checked by examining the loads at 10% to 90% of travel. Both the spring constant and adjustment can then be compared to normal values.

(3) Seat Load—Seat load is determined by measuring the pressure difference between points 1 and 2 on the curve. Point 1 is where the valve plug first contacts the seat, and is accompanied by a very radical change in slope. Point 2 is the maximum pressure on the diaphragm where the valve plug is fully seated. Multiplying this pressure difference times the effective area of the diaphragm yields the seat load in force units, which can be compared to acceptable levels given valve size and service conditions.

Figure 5:
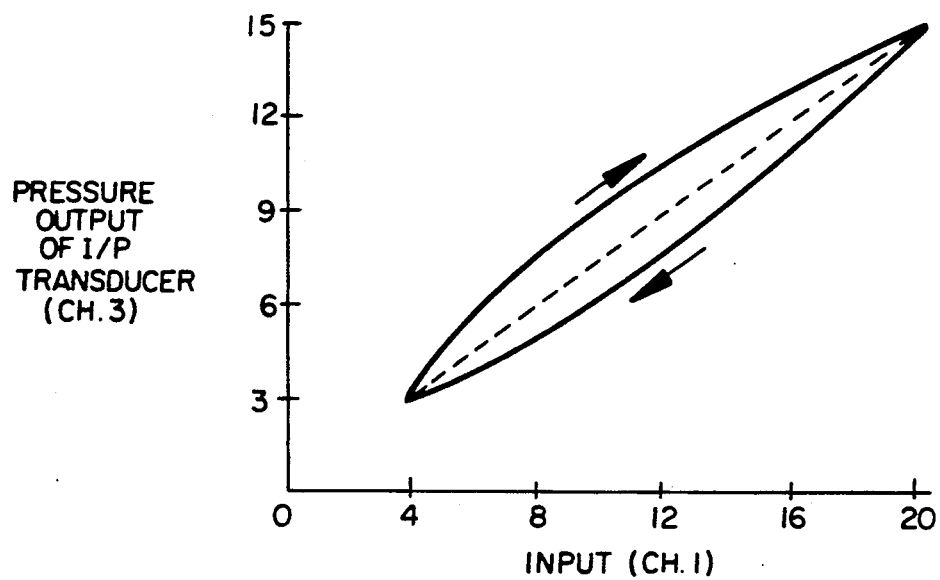
Figure 6:
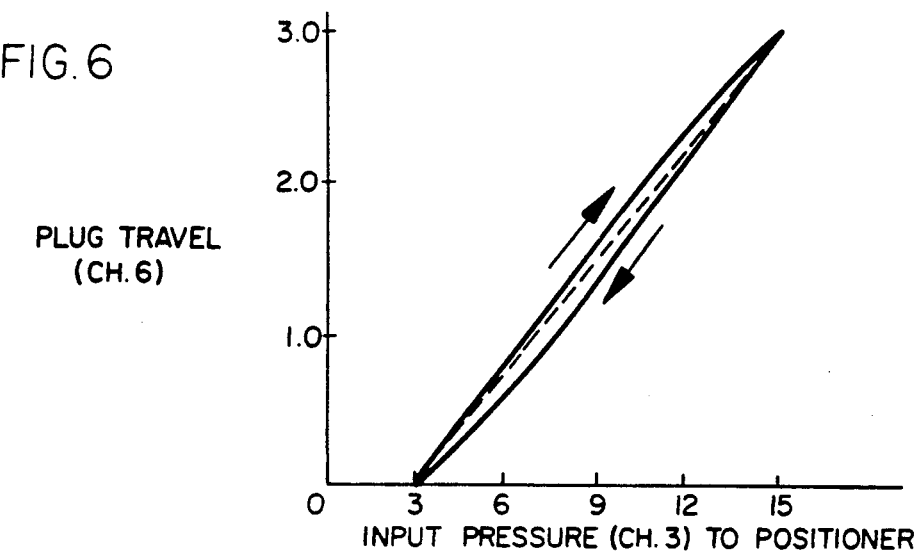

Additional graphic plots utilizing the sensed valve parameter information can be prepared as illustrated in FIGS. 5 through 8. FIG. 5 is a plot of the output pressure derived on channel 3 as a function of the input control current on channel 1 as the valve is stroked through a test operation cycle from open to close and returned to open. FIG. 5 can be used to generate a deviation cycle thereby providing a complete picture of transducer 42 operation, including characteristics of linearity, hysteresis and range. The same type of calibration information for valve positioner 44 can be developed from FIG. 6. FIG. 6 represents the plot of information derived from valve plug movement or travel on channel 6 as a function of input pressure on channel 3 during the valve test operation cycle.

Figure 7:
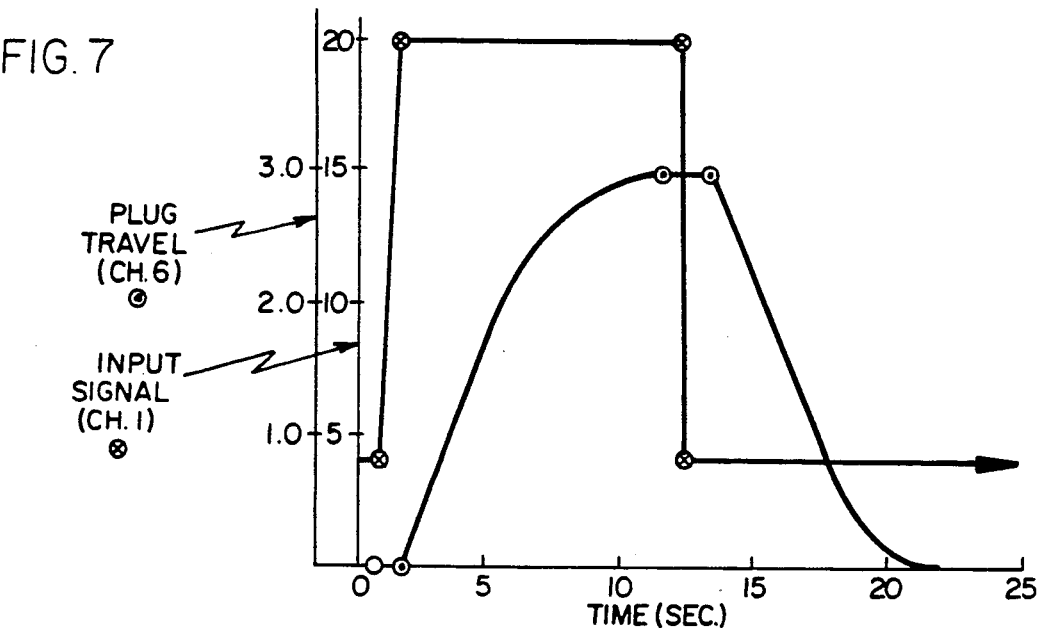
Figure 8:
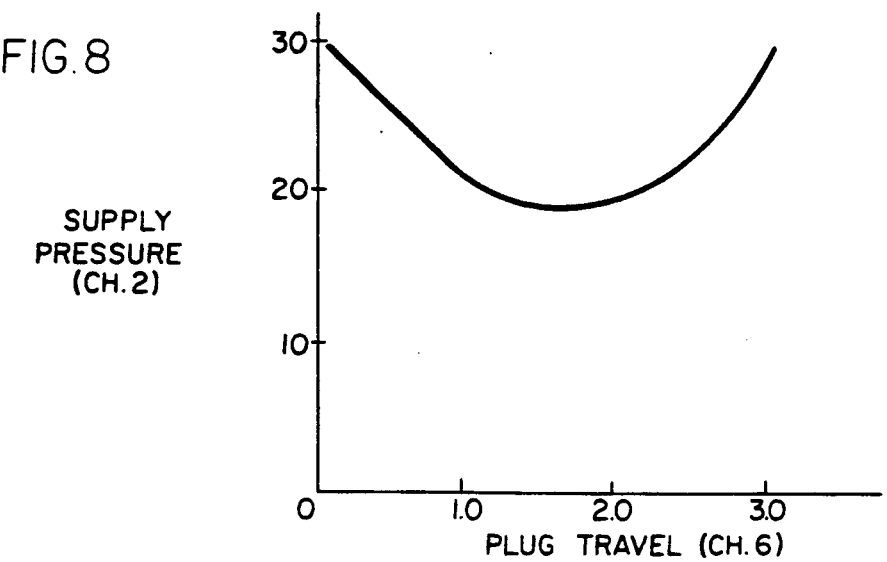

FIG. 7 represents the valve travel information on channel 6 and also the input current signal on channel 1 (either ramp, step-change or on-off) as a function of time. FIG. 7 allows one to verify the amount of valve travel and the stroking speed during operation, thereby dynamically testing whether the valve is operating within frictional limits, etc. FIG. 8 is a plot of the supply pressure on channel 2 as a function of the valve distance on channel 6 during the valve test operation cycle. An evaluation of the plot of FIG. 8 can be made so that the effect of supply pressure on valve stroking time can be evaluated.

Accordingly, the valve diagnostic information provided in accordance with the present information and as illustrated for instance in FIGS. 4–8, enable those skilled in the art to very quickly determine where any valve problems occur and to take appropriate action to remedy such problems before they cause extensive valve damage or, in the worse case, a forced system shutdown. Extensive use of the present invention in a fluid control system as part of a preventative maintenance program should greatly reduce the expenditures associated with valve maintenance as well as improve system reliability and availability.

It is to be understood that the valve test operation cycle can be run from the open to the closed and again to the open position or vice versa. In addition, less than all of the test operation cycle may be run in accordance with the present invention in order to provide useful valve output diagnostic information. As an example, in FIG. 4, valuable seat load information is determined between points 1 and 2 on the illustrated curve and the valve need only be stroked in order to encompass these two points. Therefore either a partial or a full cycle may be utilized.

In addition, while the illustrated embodiment of this invention is in connection with sliding stem valves, it is to be understood that the same principles apply as well to other types of valves such as rotary discs or balls. Similarly, rather than detecting the position and thereby the valve travel by detecting the movement of positioner arm 60, or of valve stem 16 or of actuator stem 14, the movement of any other part associated with the movement of valve plug 18 can be utilized. As an example, one could, if desired, detect linear movement of diaphragm plate 12 since the plate is integrally connected to and therefore moves integrally with valve plug 18. Sensors 70, 72, 74, 76 can be located in diagnostic controller 30 and connected to the respective pneumatic lines through suitable air lines if desired.

The foregoing detailed description has been given for clearness of understanding only, and no unnecessary limitations should be understood therefrom, as modifications will be obvious to those skilled in the art.

What is claimed is:

1. A method for diagnostically dynamic testing and determining the dynamic operating condition of a pneumatically operated fluid control valve assembly having a valve actuator connected to a valve flow control member for movement between respective closed and open valve positions, and a valve positioner pneumatically coupled to said valve actuator, said method comparing a dynamic output of said valve assembly in response to a dynamic input to said valve assembly comprising the step of:

providing a controlled variable pneumatic pressure to the input of the valve positioner forming a dynamic input to said valve assembly to operate the valve in a dynamic test operation cycle defined by removing the flow control member between said respective closed and open valve positions;

providing a pressure sensor to sense said controlled varying pressure at the input of the valve positioner;

providing a position sensor to sense movement of the flow control member representing a dynamic output of said valve assembly;

obtaining a first signal from the pressure sensor corresponding to said controlled varying pressure at the valve positioner input during the dynamic test operation cycle;

obtaining a second signal from the position sensor corresponding to movement of the flow control member in response to said dynamic input to said valve assembly during the dynamic test operating cycle;

processing said first signal and said second signal to derive valve diagnostic data representing the movement of the flow control member during the dynamic test operation cycle as a function of the variation in said controlled variable pneumatic pressure to the input of the valve positioner; and displaying said valve diagnostic data for enabling determination of the dynamic performance of said valve assembly positioner under test.

2. The method of claim 1, wherein said valve actuator includes a valve actuator spring, including the steps of:

providing a valve actuator pressure sensor to sense varying pressure at the input of the valve actuator;

obtaining a third signal from the valve actuator pressure sensor corresponding to varying pressure at the valve actuator input during the test operation cycle;

processing said second and third signals to derive valve diagnostic data representing the variation in pressure at the valve actuator input as a function of movement of the flow control member during the test operation cycle; and displaying said valve diagnostic data for enabling determination of the characteristics of said valve actuator spring for said valve assembly under test.

3. The method of claim 2, including displaying said valve diagnostic data for enabling determination of the valve actuator spring adjustment values for said valve assembly under test.

4. The method of claim 2, including displaying said valve diagnostic data for enabling determination of the valve actuator spring constant values for said valve assembly under test.

5. The method of claim 1, wherein said valve flow control member is moved between respective closed and open valve positions with respect to a valve seat, including the step of:

providing a valve actuator pressure sensor to sense varying pressure at the input of the valve actuator;

obtaining a third signal from the valve actuator pressure sensor corresponding to varying pressure at the valve actuator input during the dynamic test operation cycle for flow control member movements encompassing the fully closed valve position wherein said flow control member is seated on the valve seat;

obtaining said second signal during the dynamic test operation cycle for flow control member movements encompassing the fully closed valve positions;

processing said third signal and said second signal to derive valve diagnostic data representing the variation in pressure at the valve actuator input as a function of movement of the flow control member during the dynamic test operation cycle corresponding to flow control member movements encompassing the fully closed valve position; and displaying said valve diagnostic data for enabling determination of the seating conditions of said flow control member on the valve seat for said valve assembly under test;

including the steps of displaying pressure values between at least two pneumatic pressure values at the end of the dynamic test operation cycle corresponding to closing of the valve as the flow control member initially contacts the valve seat and continuing until it is then totally seated against the valve seat, said two pneumatic pressure values including a pressure value (1) at the first point in flow control member travel where the pneumatic pressure initially abruptly changes in value at the end of the dynamic test operation cycle and a pressure value (2) at the second point in the continued travel of the flow control member where the maximum pneumatic pressure value is reached and the pressure again abruptly changes as the flow control member travel direction is reversed.

6. The method of claim 1, including displaying said valve diagnostic data for enabling determination of valve positioner calibration values for said valve under test.

* * * * *

UNITED STATES PATENT AND TRADEMARK OFFICE
CERTIFICATE OF CORRECTION

PATENT NO. : 5,197,328
DATED : March 30, 1993
INVENTOR(S) : WILLIAM V. FITZGERALD It is certified that error appears in the above-indentified patent and that said Letters Patent is hereby corrected as shown below:

Col. 2, line 25, change "confirming" to --conforming--.

Col. 5, line 24, change "Fn>(Ffr+FU1)+FL(4)" to
--Fn>(Ffr+FU1)+FL               (4)--

Col. 10, line 1, change "removing" to --moving--.

Signed and Sealed this

Twenty-third Day of August, 1994

Attest:

BRUCE LEHMAN

Attesting Officer       Commissioner of Patents and Trademarks